(12) United States Patent
Higuchi et al.

(10) Patent No.: US 8,989,555 B2
(45) Date of Patent: Mar. 24, 2015

(54) INFORMATION PROCESSOR

(75) Inventors: Haruhiko Higuchi, Fujisawa (JP);
Hiromi Nishiura, Fujisawa (JP);
Tsutomu Usui, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 708 days.

(21) Appl. No.: 12/430,151

(22) Filed: Apr. 27, 2009

(65) Prior Publication Data

US 2010/0054704 A1 Mar. 4, 2010

(30) Foreign Application Priority Data

Sep. 2, 2008 (JP) ................................ 2008-224245

(51) Int. Cl.
*H04N 5/225* (2006.01)
*H04N 9/80* (2006.01)
*G06K 9/00* (2006.01)
*H04N 5/781* (2006.01)
*G11B 27/10* (2006.01)
*G11B 27/34* (2006.01)

(52) U.S. Cl.
CPC .............. *H04N 5/781* (2013.01); *G11B 27/105* (2013.01); *G11B 27/34* (2013.01)
USPC ............ 386/241; 348/169; 382/103; 382/170

(58) Field of Classification Search
CPC ............ H04N 5/225; H04N 9/80; G06K 9/00
USPC ................. 386/241, E5.001; 348/169, E7.09; 382/103, 170
See application file for complete search history.

(56) References Cited

U.S. PATENT DOCUMENTS

| | | | |
|---|---|---|---|
| 6,442,538 B1 | 8/2002 | Nojima | |
| 2007/0127773 A1 | 6/2007 | Ogawa | |
| 2008/0063238 A1* | 3/2008 | Wiedemann et al. | 382/103 |
| 2009/0059008 A1* | 3/2009 | Ishii | 348/169 |

FOREIGN PATENT DOCUMENTS

| | | |
|---|---|---|
| JP | 11-338876 | 12/1999 |
| JP | 2002-290954 | 10/2002 |
| JP | 2005-210573 | 8/2005 |
| JP | 2006-060279 | 3/2006 |
| JP | 2007-110193 | 4/2007 |
| JP | 2007-281680 | 10/2007 |
| JP | 2008-160558 | 7/2008 |

OTHER PUBLICATIONS

Office Action dated Apr. 24, 2012, issued in corresponding Japanese Patent Application No. 2008-224245.

* cited by examiner

*Primary Examiner* — Thai Tran
*Assistant Examiner* — Syed Hasan
(74) *Attorney, Agent, or Firm* — Baker Botts LLP (57) ABSTRACT

When video data is reproduced by a recording/reproduction unit, an output unit outputs occurrence information on an object, which is not included in the video data being output by the output unit but is included the video data recorded on a recording medium, to a display unit. While the video data is being reproduced from the recording medium by the recording/reproduction unit, an instruction specifying a predetermined object condition including a non-reproduction object is input based on the occurrence information and the reproduction operation is performed by extracting video data satisfying the object condition.

12 Claims, 8 Drawing Sheets

INFORMATION PROCESSOR

INCORPORATION BY REFERENCE

The present application claims priority from Japanese application JP2008-224245 filed on Sep. 2, 2008, the content of which is hereby incorporated by reference into this application.

BACKGROUND OF THE INVENTION

The present invention relates to an information processor that performs information search.

The background art of this technology is disclosed, for example, in JP-A-2006-60279 "Motion image reproducing apparatus" and JP-A-11-338876 "method and device for retrieving image, and storage medium".

JP-A-2006-60279 describes in PROBLEM that "when a moving image can be easily reproduced and edited using an information processing device that continuously reproduces only information including a particular object, an increasing need arises to search for a desired video instantly and accurately from the recorded images", and in SOLUTION that "a moving image reproduction device for reproducing a moving image frame including a plurality of frames comprises an object selecting unit for selecting an arbitrary object in a moving image frame, an object information acquiring unit for acquiring the information on the selected object, an object extraction unit for searching the moving image frame on the basis of the acquired object information to extract an image containing the selected object, and a reproducing unit for reproducing the extracted image. This structure allows a user to make a search based on the object information to extract the moving image of a scene including a desired object".

JP-A-11-338876 describes in PROBLEM that "To enable a user to search for a video scene, based on the feature of each video object, when the user searches a video file encoded on a content basis" and in SOLUTION that "Stream separation is executed in a process 70 at a video data registration time, annotation information such as the feature amount of an image is extracted for each video content in processes 71-73, and the extracted information is stored in a video information table area 51 as video objects. At a search time, the user designates a search condition for each video object. If the search condition is specified as a search of a set of multiple objects, the device searches the objects, one at a time, and after that, based on the occurrence time interval information on the matched objects, judges the simultaneous occurrence of the matched objects to search for and present the user's desired video scene".

Objects mentioned in JP-A-2006-60279 and JP-A-11-338876 are mainly specific objects included in the video such as the subjects of a video.

SUMMARY OF THE INVENTION

The device disclosed in JP-A-2006-60279 allows the user to specify a specific object for extracting information including the object. However, on the device disclosed in JP-A-2006-60279, an object can be selected only from the moving image frame being reproduced but there is no way to find an object that will occur in the scenes other than those being reproduced. So, the problem is that it takes time for the user to find and select a desired object. That is, when the user specifies an object on the device disclosed in JP-A-2006-60279, the user has no way to know the total picture such as a range in which each object occurs. This generates the problem that, after extracting information, the user must waste time in specifying an additional object and extracting information again as well as the problem that the user tends to fail to notice an object that will occur in a moving image frame other than the one being reproduced. In addition, the device disclosed in JP-A-2006-60279 has the problem that the user has no way to know how much information is extracted.

The device disclosed in JP-A-11-338876 allows the user to "specify a search condition for each video element object to execute a search". However, on the device disclosed in JP-A-11-338876, a search condition can be specified only before starting reproduction but a search condition for an object cannot be re-specified while a video scene is being reproduced. So, the problem is that the user who wants to change a search condition cannot change it while a video scene is being reproduced.

It is an object of the present invention to improve the problems described above. More specifically, an object of the present invention is to provide an information processor that improves the user's ease of use when the user searches for information.

The object given above is achieved by the invention described in CLAIMS. For example, an information processor comprises a recording unit that records video/audio information on a recording medium; a reproduction unit that reproduces video/audio information from a recording medium; an output unit that outputs video/audio information, reproduced by the reproduction unit, to a display unit; an object condition input unit that receives an instruction specifying a predetermined condition for an object included in video/audio information recorded on a recording medium; and a control unit that controls the reproduction unit to reproduce video/audio information, which satisfies the predetermined condition, from video/audio information recorded on the recording medium based on the predetermined condition received from the object condition input unit. While video/audio information is being reproduced from the recording medium by the reproduction unit, the control unit causes the output unit to output occurrence information on a non-reproduction object to the display unit, wherein the non-reproduction object is an object not included in video/audio information being output by the output unit but is included in video/audio information recorded on the recording medium. While video/audio information is being reproduced from the recording medium by the reproduction unit, the object condition input unit is able to receive an instruction specifying a predetermined condition including the non-reproduction object.

According to the present invention, the user's ease of use of the information processor is improved.

Other objects, features and advantages of the invention will become apparent from the following description of the embodiments of the invention taken in conjunction with the accompanying drawings.

DESCRIPTION OF THE EMBODIMENTS

Examples of the best mode for carrying out the present invention will be described below using embodiments.

[First Embodiment]

As a first embodiment, the following describes how an information processor extracts and reproduces video data that includes a particular object.

Figure 1:
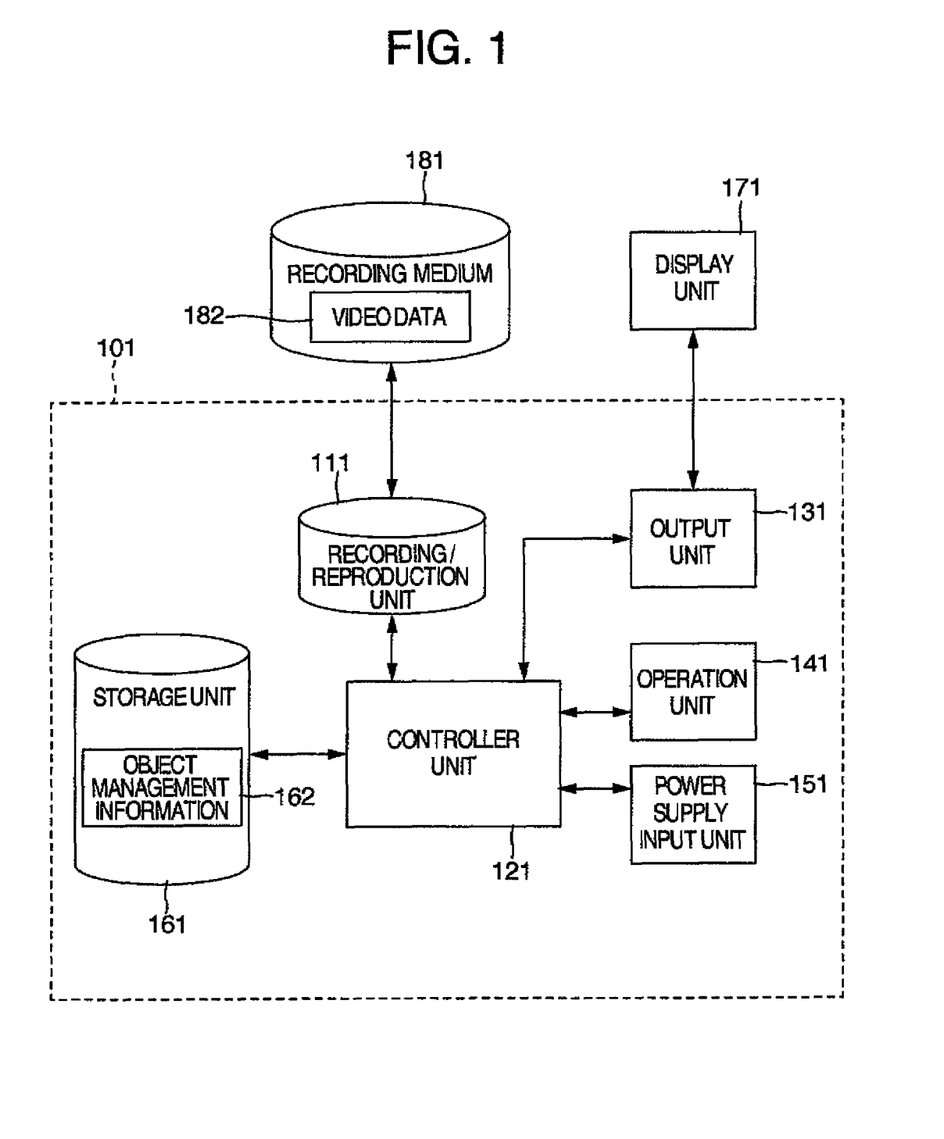
FIG. 1 is a block diagram showing an example of the configuration of a video reproduction device in first and second embodiments.

FIG. 1 is a block diagram showing an example of the configuration of a video reproduction device 101 that is an example of the information processor in the first embodiment. The numeral 111 indicates a recording/reproduction unit that records or reproduces video data 182 to or from a recording medium 181 such as an HDD. The numeral 121 indicates a control unit comprising the CPU, which controls the whole device, and a memory. The numeral 131 is an output unit that outputs the signals of object management information and video data, and the various types of signals output from the output unit 131 are displayed on the screen by a display unit 171. Although provided outside a video reproduction device 101 in this embodiment, the display unit 171 may also be provided in the video reproduction device 101. The numeral 141 indicates an operation unit that accepts an input to start or stop searching for recorded information or to specify an object at a search time. The numeral 151 indicates a power supply input unit 151 that supplies power to the components of this device, for example, the power supply from the AC power supply or a battery is input. The numeral 161 indicates a storage unit, such as a semiconductor memory, in which management information 162 on each object and so on are stored. The numeral 162 indicates object management information that includes information on the occurrence range of each object. Although stored in the storage unit 161 in this embodiment, the object management information 162 may also be recorded in conjunction with the video data 182 on the recording medium 181, such as an HDD, by the recording/reproduction unit 111.

In the description below, the objects included in video data are assumed to include various conditions for video data, such as a particular person (leading character of a drama, user's child), smile, brightness of video data, focus of video data, camera shake effect on video data, and CM.

The following describes the operation of the video reproduction device 101 in detail. The recording/reproduction unit 111 extracts video data, which satisfies a predetermined object condition, from the video data 182 recorded on the recording medium 181 under control of the control unit 121 and reproduces the extracted video data. The video data reproduced by the recording/reproduction unit is output to the display unit 171 by the output unit 131 for display on the screen. Note that the object management information 162 stores information on the objects included in the video data 182 (for example, information on the occurrence time of the objects). Based on this object management information 162, the control unit 121 causes the recording/reproduction unit 111 to extract video data, which satisfies the predetermined object condition, and to reproduce the extracted video data. While the video data 182 is being reproduced by the recording/reproduction unit 111, this video reproduction device 101 outputs the occurrence information on an object (hereinafter called a non-reproduction object), which is not included in the video data being output by the output unit 131 but is included in the video data 182 recorded on the recording medium 181, to the display unit 171 via the output unit 131. In addition, while the video data 182 is being reproduced from the recording medium 181 by the recording/reproduction unit 111, an instruction, which specifies a predetermined object condition including a non-reproduction object, is input from the operation unit 141 based on the occurrence information that is output on the display unit 171. The recording/reproduction unit 111 extracts video data, which satisfies the specified object condition, and reproduces the extracted video data.

An example of the object condition mentioned here is a logical sum, a logical product, or a logical difference of any object groups; for example, when video data includes predetermined object A and object B, the object condition is "object A occurs", "object A or object B occurs", "object A occurs but object B does not occur", etc. Of course, the more there are objects that are set, the more there are the variations of object condition combinations.

As described above, while video data is being reproduced, this video reproduction device 101 displays the occurrence information on the objects included in the video data but not occurring on the reproduction screen (that is, non-reproduction objects) on the screen for notifying the user about the occurrence information and, while the video data is being reproduced, allows the user to specify an object condition including an object condition for a non-reproduction object, thus increasing the user's ease of use.

Figure 2:
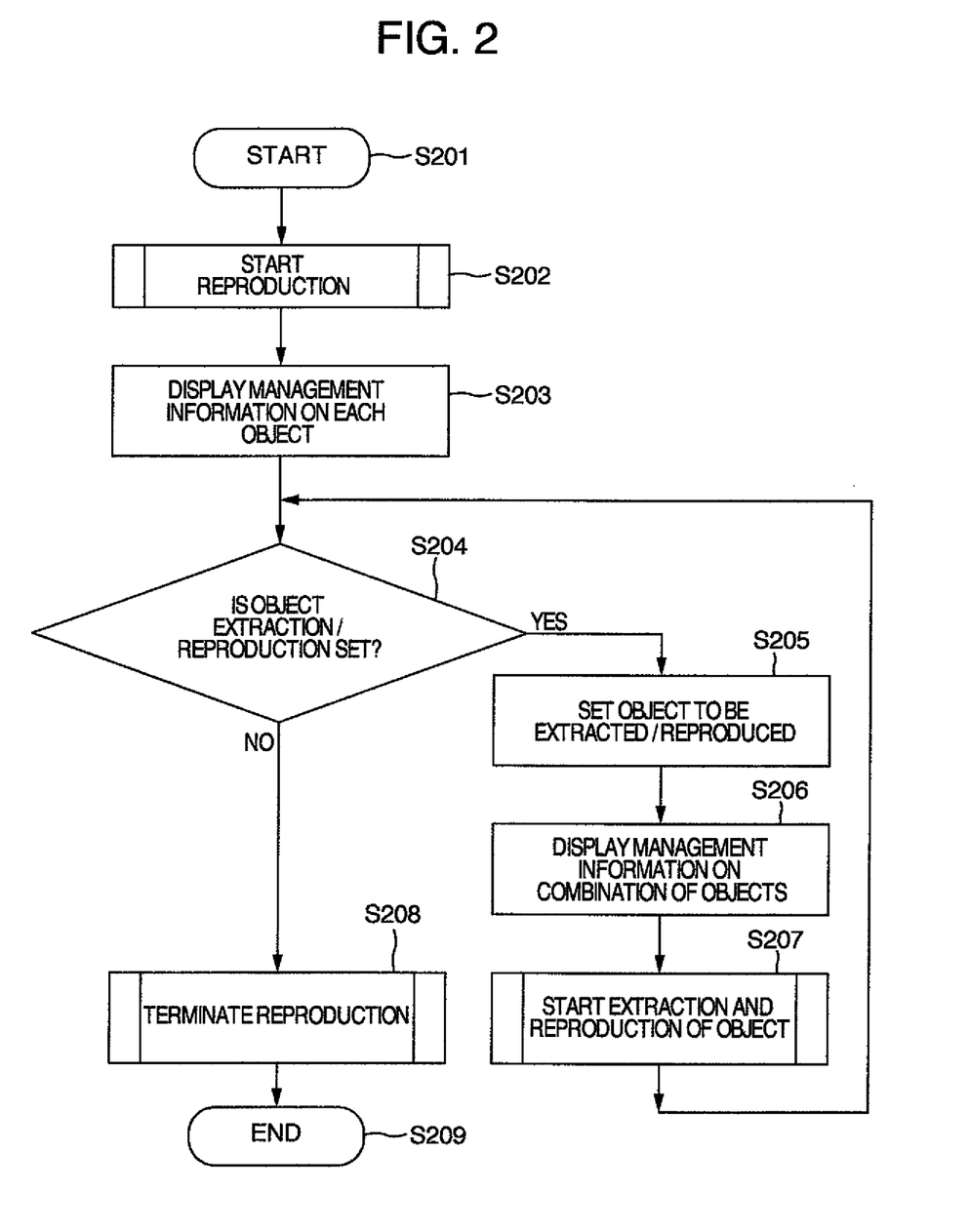
FIG. 2 is a flowchart showing an example of the processing in the first and second embodiments.

FIG. 2 is a flowchart showing an example of the operation procedure of the video reproduction device 101 in this embodiment. When the reproduction of a video is started in step 202 (S202), the information on the time zones, in which each object included in the video data 182 occurs, is displayed on the display unit 171 as the management information display of each object as shown in step 203 (S203). If the extraction and reproduction of an object is selected in step 204 (S204), the input of the condition setting of a predetermined object to be extracted and reproduced is accepted by the operation unit 141 in step 205 (S205). In step 206, information on the time zones, in which the video data satisfying the specified object condition occurs, and the information on the total time are displayed on the display unit 171 (S206) and, in step 207, the video data is reproduced based on the object condition (S207). The processing from step 205 to step 207 is executed each time an object condition is set via the operation unit 141 during the reproduction, and an object condition is set repeatedly via the operation unit 141 until the video reproduction is terminated in step 208 (S208).

The operation described above allows the user to know the occurrence information on the objects not yet reproduced (non-reproduction objects) and to extract and reproduce video data more reliably without failing to notice an object during the extraction/reproduction operation of video data.

The following describes an example of the display screen of the video reproduction device.

Figure 3:
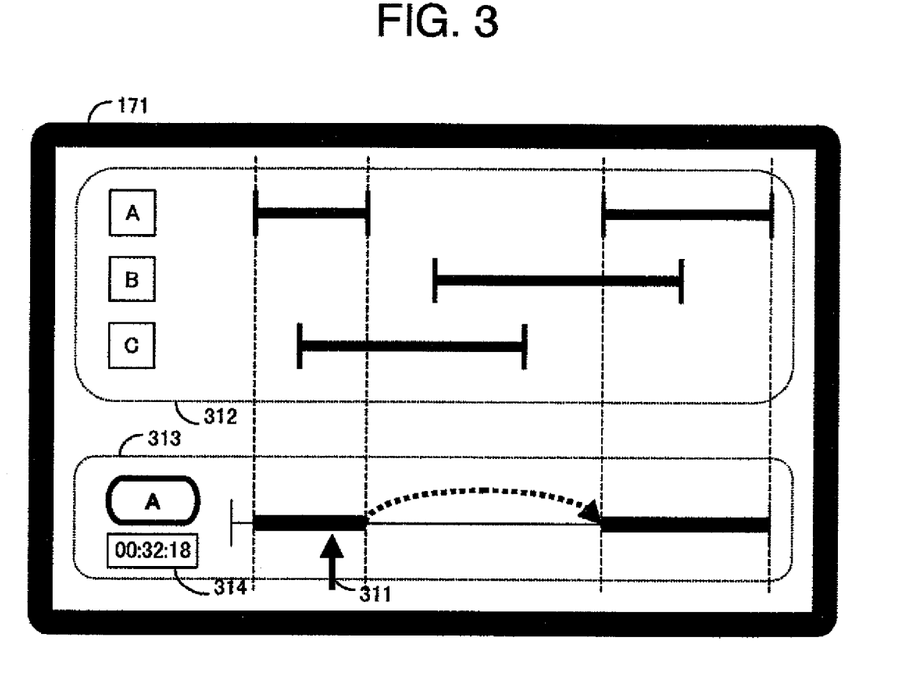
FIG. 3 is a diagram showing an example of the screen display indicating an example of the processing of an information processor.

FIG. 3 is a diagram showing an example of the screen display indicating the occurrences of objects recorded in a video. For example, this screen is displayed on the display unit 171 in step 203 or step 206 in the flowchart in FIG. 2. The numeral 171 indicates a display unit such as an LCD. The numeral 311 indicates the time elapsed from the start of reproduction. The numeral 312 indicates the objects recorded in the video data and the time zones in which the objects occur in the video. For example, during the time indicated by the numeral 311 in FIG. 3, the display indicates that the objects A and C occur in the video. The numeral 313 indicates the time zones in which an arbitrary combination of objects A, B, and C occur in the video data. For example, the numeral 313 in FIG. 3 indicates the time zones in which the object A occurs.

Displaying both the occurrence time zones and the non-occurrence time zones of the objects on the time axis so that the user can distinguish between them allows the user to easily know the occurrence status of the objects. In addition, displaying the occurrence status of video data, which satisfies a particular user-selected object condition, on the time axis allows the user to easily know the occurrence status of video data to be extracted and reproduced. In addition, the total time of video data, which satisfies a user-selected particular object condition, is displayed on the screen in this embodiment. For example, in this embodiment, the total time of video data in which the object A occurs is displayed on the screen of the display unit 171 as indicated by the numeral 314 in FIG. 3. This displayed information allows the user to appropriately set an object condition considering the total time of video data that is extracted and reproduced.

Figure 4:
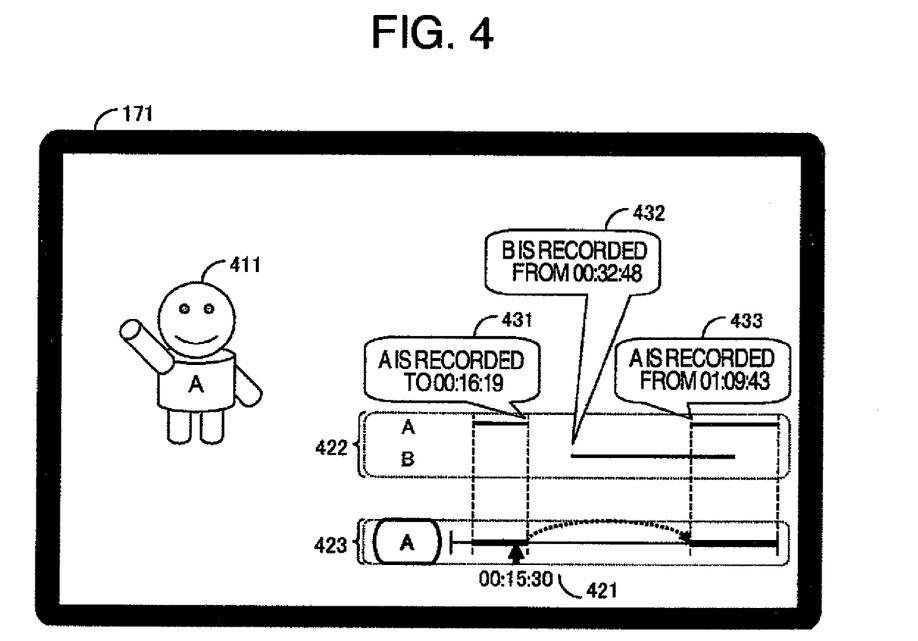
FIG. 4 is a diagram showing an example of the screen display indicating an example of the processing in a first embodiment.

FIG. 4 is a diagram showing another example of the screen display indicating the occurrence of objects recorded in a video. For example, as in FIG. 3, this screen is displayed on the display unit 171 in step 203 or step 206 in the flowchart in FIG. 2. The numeral 411 indicates the object A (in this example, the person A). The numeral 421 indicates the time elapsed from the start of reproduction and also indicates the positions in graphs 422 and 423 that are being reproduced. The numerals 521, 621, 721, 821, and 921 in the subsequent figures indicate the same as that indicated by the numeral 421. The graph 422 indicates the time zones in which the objects occur in the video. For example, the numeral 422 in FIG. 4 indicates that the object A and object B occur in the video and that the object A occurs in the video at the reproduction time 00:15:30. The numeral 423 indicates the combination of object conditions that are selected and reproduced and also indicates the time zones in which an arbitrary combination of the objects A and B occurs in the video. For example, the numeral 423 in FIG. 4 indicates the time zones in which the object A occurs. The combination of objects can be obtained, for example, by the logical sum of objects. Although displayed as the bar graphs in FIG. 4, the occurrences of objects in 422 and 423 may also be displayed as some other graph or as text (for example, message) indicating the time at which the objects occur such as those indicated by numerals 431, 432, and 433.

For example, FIG. 4 shows the reproduction of only the video in which the object A (411) occurs.

Before automatically skipping to the reproduction time 01:09:43, the user can view this screen to confirm the time at which the object B will occur and the time at which the object A will occur next.

Figure 5:
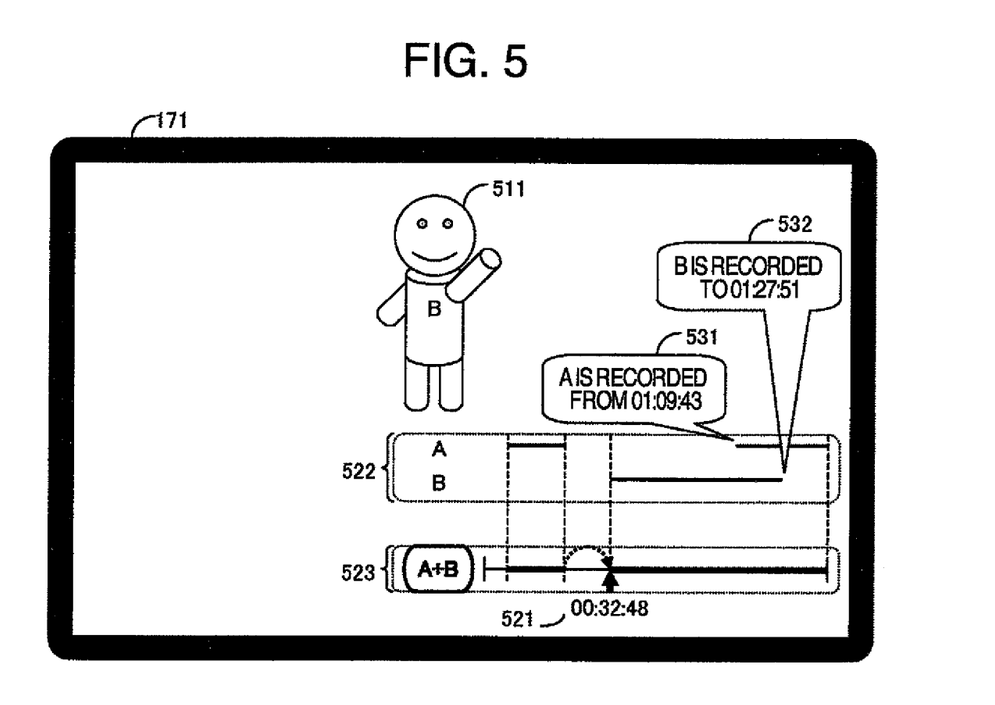
FIG. 5 is a diagram showing an example of the screen display indicating an example of the processing in the first embodiment.

If the object B is added to the object condition via the operation unit 141 while the screen in FIG. 4 is being displayed, the display screen is changed to that shown in FIG. 5 and the video data, in which the object A or the object B (511) occurs, is extracted and reproduced.

In this way, this embodiment allows the user to change the object condition appropriately, for example, to add an object to the object condition as necessary during reproduction, thereby increasing the user's ease of use.

That is, in the conventional extraction/reproduction operation on video data, when the video is reproduced to the reproduction time 00:16:19, the reproduction automatically skips to the reproduction time 01:09:43 at which the object A occurs next and, as a result, the user cannot view the video in which the object B begins to occur.

This embodiment reduces the possibility of failing to notice an object during the reproduction. In addition, the ability to change the object condition during reproduction further increases the flexibility in the extraction operation. That is, this embodiment allows the user to set the object condition in a variety of ways, increasing the convenience of the video data extraction/reproduction operation.

Although the processing of the extraction/reproduction operation has been described with video data as an example, the present invention is not limited to this processing. That is, the present invention is applicable to the reproduction of not only video data but also audio data.

Although the user operates the operation unit 141 in this embodiment to set an object condition, this embodiment is not limited to this configuration. For example, the display unit 171 may be a touch panel on which the user directly touches by a finger or may be an infrared remote controller that can be operated from a position remote from the video reproduction device. It is also possible that the user sets an object condition by selecting displayed objects such as text, an icon, or a thumbnail. Furthermore, it is also possible for the user to select an object via speech voice.

[Second Embodiment]

Figure 6:
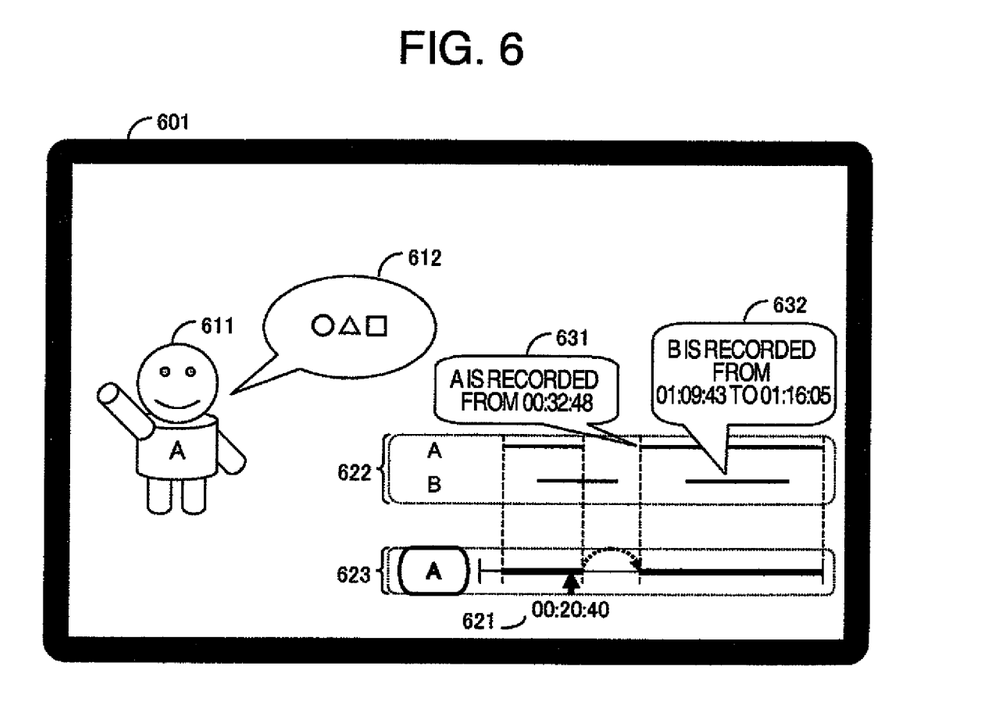
FIG. 6 is a diagram showing an example of the screen display indicating an example of the processing in a second embodiment.
Figure 7:
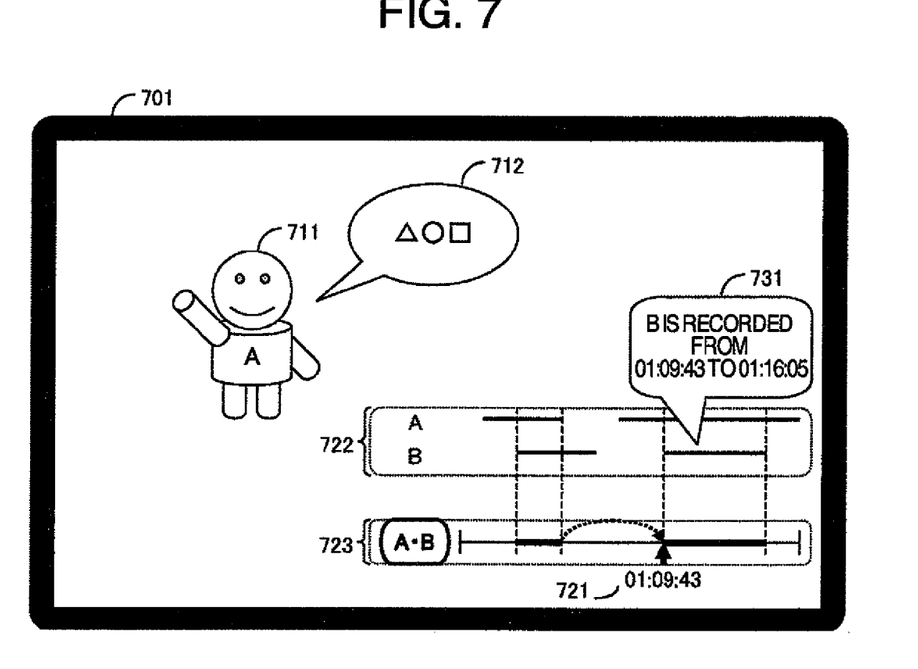
FIG. 7 is a diagram showing an example of the screen display indicating an example of the processing in the second embodiment.

The following describes a second embodiment in which the object A and object B occur in a video as shown in FIG. 6 and FIG. 7. The components in the figures are the same as those in FIG. 4. Note that the object B is the speech voice of the object A. That is, in this embodiment, the speech voice of the object A is sensed and is detected as the object B. The block diagram and the operation procedure of a video reproduction device in this embodiment are the same as those of the first embodiment shown in FIGS. 1 and 2 and so the description is omitted here.

For example, FIG. 6 shows the reproduction of video data in which the object A (611) occurs, and FIG. 7 shows the reproduction of video data in which both the object A (711) and the object B (712) occur. Note that the object B (612, 712) is defined as the speech voice of the object A (611, 711).

When video data in which the object A occurs is reproduced as shown in FIG. 6, or when video data in which both the object A and the object B occur is reproduced as shown in FIG. 7, during the conventional extraction/reproduction operation on video data, the user cannot set the extraction/reproduction operation on video data, that is, the user cannot change the object condition, by checking the occurrence status of non-reproduction objects during the reproduction.

Figure 8:
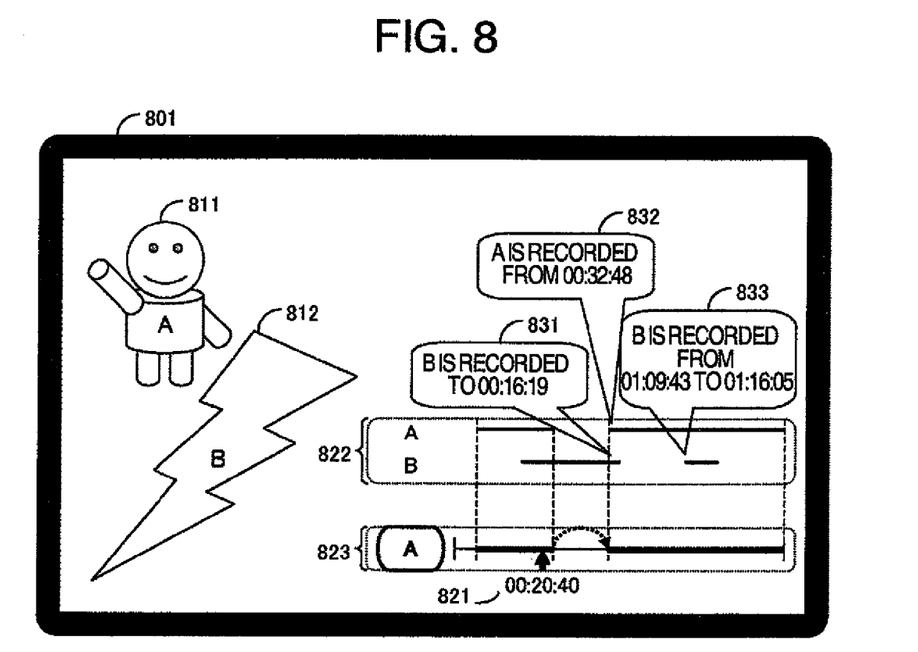
FIG. 8 is a diagram showing an example of the screen display indicating an example of the processing in the second embodiment.
Figure 9:
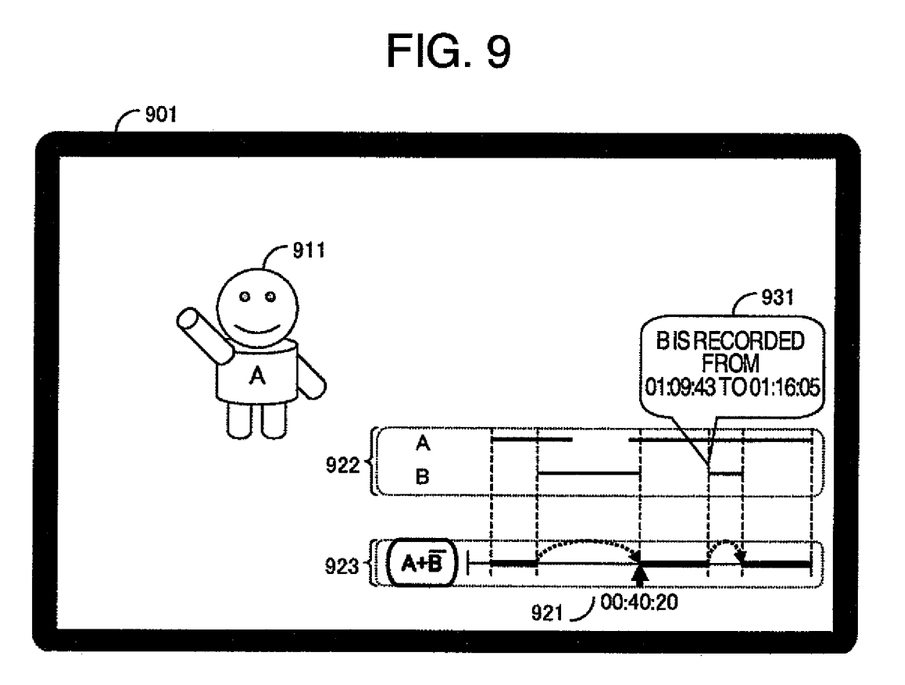
FIG. 9 is a diagram showing an example of the screen display indicating an example of the processing in the second embodiment.

When the user, who is reproducing video data in which the object A occurs as shown in FIG. 6, wants to extract and reproduce only a scene in which the object A is talking is included, the present invention allows the user to appropriately change the object condition to reproduce video data in which both the object A and the object B occur as shown in FIG. 7. In addition, setting an object condition using not only persons and things but also voices as shown in this embodiment allows the user to perform the video data extraction/reproduction operation in a variety of ways, thus increasing the user's convenience. In addition, the object is not limited to voices. For example, various factors, such as "volume is higher than a predetermined value", "smile", and "noise", may be used as the object and, by using those factors as the object, various types of extraction/reproduction operation can be performed. For example, FIG. 8 and FIG. 9 show examples in which the object A is the person A (811, 911) and the object B is the noise B (812). The screen shown in FIG. 8 is displayed while the user is reproducing video data in which the object A occurs. The screens may be displayed in such a way that the screen display is displayed as a part of the reproduction video screen so that the screen display is overlaid on the reproduction video screen or in such a way that the display is switched between the reproduction video screen and the screen display according to an operation by the user. The user can check the screen shown in FIG. 8 to know the time zones in which the noise B occurs. At this time, the user can change the object condition to the object condition "object A occurs but object B does not occur" to perform the extraction/reproduction operation in which the scene including the noise B is removed from the scenes including the person A as shown in FIG. 9.

As described above, the present invention provides the user with the ability to change the setting to an appropriate object condition during reproduction. This ability allows the user to perform the extraction/reproduction operation while appropriately selecting desired scenes and removing undesired scenes during reproduction, increasing the user's convenience.

Next, the following describes the operation to store reproduction history. In this embodiment, the history of the object conditions that are set on video data is stored in the storage unit 161. That is, the reproduction history of video data, reproduced according to the flowchart shown in FIG. 2, is stored so that the video data can be reproduced at the next reproduction time according to the reproduction history stored in the storage unit 161.

So, once the extraction/reproduction operation on video data is performed according to the procedure in FIG. 2, the user who wants to perform the similar reproduction can easily perform the extraction/reproduction operation without setting an object condition again according to the procedure in FIG. 2.

Although examples of a logical sum search, a logical product search, and a logical difference search for multiple objects are described in the first embodiment and the second embodiment, it is also possible to further combine those conditions.

[Third Embodiment]

The following describes, as a third embodiment, an information processor that extracts video data satisfying a predetermined object condition and performs the dubbing processing or the move processing.

Figure 10:
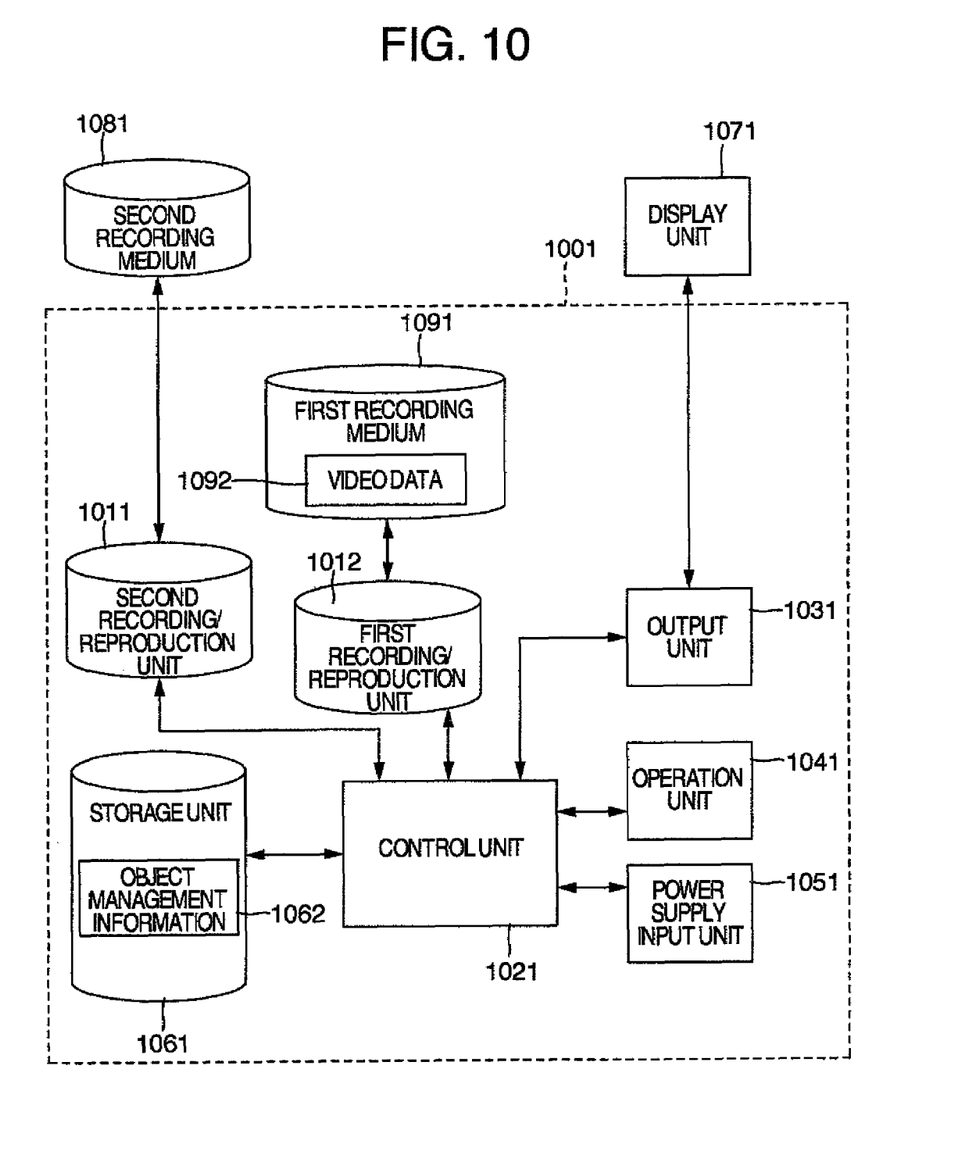
FIG. 10 is a block diagram showing an example of the configuration of an information processor in a third embodiment.

FIG. 10 is a block diagram showing an example of the configuration of an information processor 1001 in the third embodiment. The numeral 1012 indicates a first recording/reproduction unit that records or reproduces video data 1092 to or from a first recording medium 1091 such as an HDD. The numeral 1011 indicates a second recording/reproduction unit that records or reproduces video data to or from a second recording medium 1081 such as an optical disc or an SD card. The other configuration is the same as that shown in the block diagram of the first embodiment shown in FIG. 1 and so the description is omitted here. Although the first recording medium is configured in the information processor 1001 and the second recording medium is configured externally to the information processor 1001 in this embodiment, the configuration of the recording media is not limited to this configuration; instead, both the first and second recording media may be configured externally to the information processor 1001 or both the first and second recording media may be configured in the information processor 1001. The types of recording medium are not limited to those described in the example described above, but this embodiment is applicable to all recording media on which information can be written.

Next, the following describes the processing when the dubbing operation is performed in this embodiment. When the dubbing operation is performed, the video data 1092 is reproduced from the first recording medium 1091 by the first recording/reproduction unit 1012. The reproduced video data 1092 is recorded to the second recording medium 1081 by the second recording/reproduction unit 1011 for dubbing. In the dubbing processing described above, the video data reproduced by the first recording/reproduction unit is reproduced in the same manner as in the first embodiment or the second embodiment. That is, the user can change the object condition setting during the dubbing processing, and the appropriate video data is extracted and reproduced by the first recording/reproduction unit 1012.

The examples of the screen displayed at this time are the same as those in FIGS. 3-9 in the first and second embodiments and so the description is omitted here. It should be noted that, during the dubbing processing, the display of the total time indicated by the numeral 314 in FIG. 3 is important. That is, the total time 314 of the video data satisfying the user-specified object condition is displayed on the screen shown in FIG. 3 to help the user to select an object condition so that the video data can be stored in the remaining amount of the second recording medium 1081 that is the dubbing destination. This display increases the user's convenience when the dubbing processing is performed.

Figure 11:
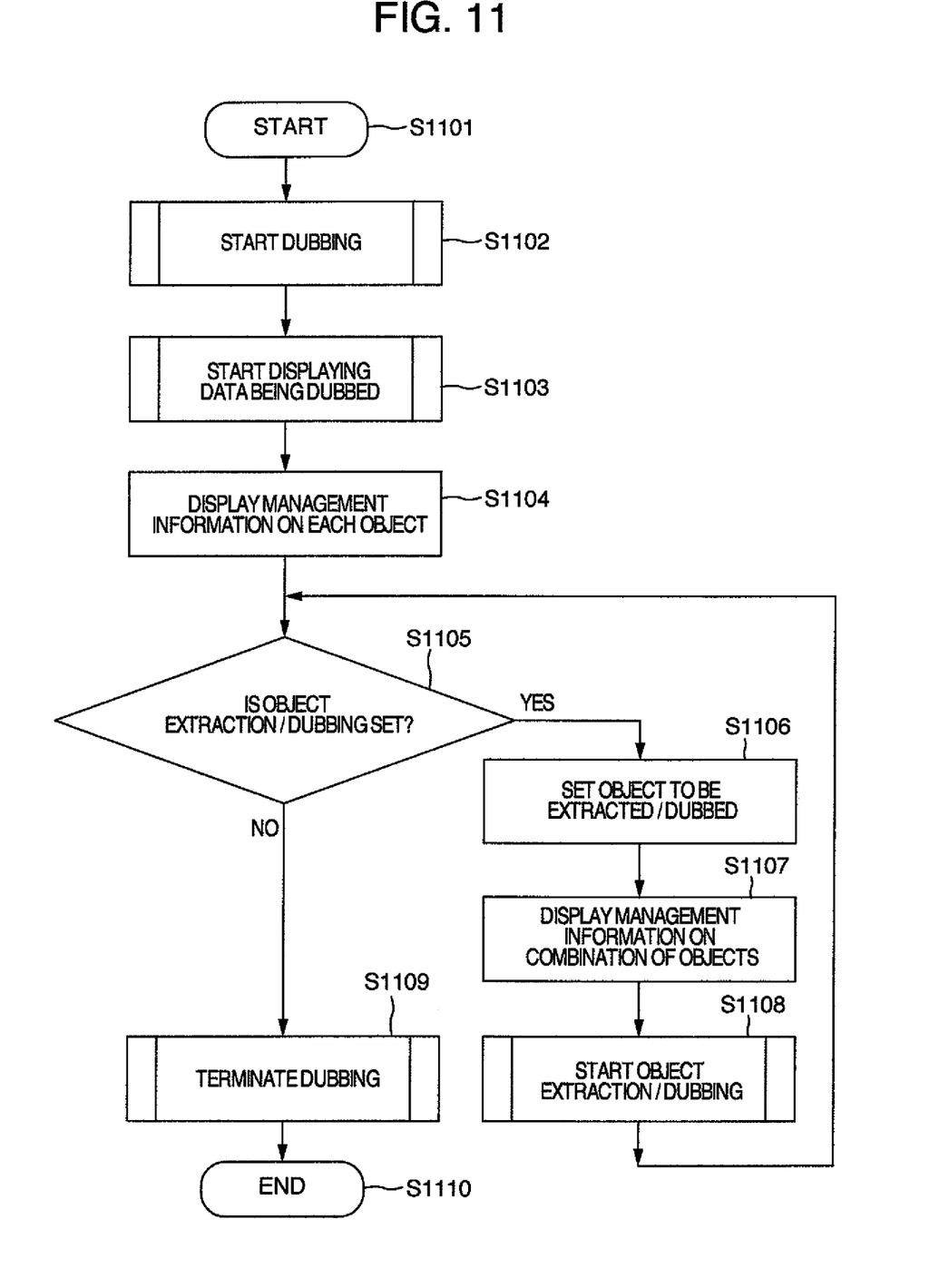
FIG. 11 is a flowchart showing an example of the processing in the third embodiment.

FIG. 11 is a flowchart showing an example of the operation procedure of an information processor in this embodiment. Basically, the procedure is the same as that of the flowchart in the first embodiment shown in FIG. 2 except that not only the reproduction operation but also the dubbing operation is performed. For example, in this embodiment, the user selects in step 1105 an object condition for the video data to be dubbed while confirming in step 1103 the reproduction video that is being dubbed at the dubbing time.

Next, the following describes an example in which the reproduction history storing processing, described in the second embodiment, is applied to this embodiment. To do so, the reproduction history of the video data extracted and reproduced according to the procedure in FIG. 2 or the reproduction history of the video data dubbed according to the procedure in FIG. 10 is first stored in a storage unit 1061. Next, when the user reproduces the video data in the same way as before for dubbing the video data, the video data is dubbed according to the reproduction history stored in the storage unit 1061.

The reproduction history, if used in this way, also allows the user to perform the extraction dubbing processing any number of times based on the reproduction history when the user wants to create multiple copies of a recording medium on which the same extracted video data is dubbed, thus reducing the user's load.

In addition, the user can perform the extraction/reproduction operation multiple times for the same video data according to the procedure in FIG. 2, determine the best extraction condition, and perform the extraction dubbing processing based on the reproduction history best suited to the user.

Although the dubbing processing is described as an example in this embodiment, this embodiment is applicable not only to the dubbing processing but also to the move processing. The move processing refers, for example, to the processing in which video data 1092 is reproduced from the first recording medium 1091, the reproduced video data 1092 is removed from the first recording medium 1091 by the first recording reproduction unit, and the reproduced video data 1092 is recorded to the second recording medium 1081 by the second recording/reproduction unit 1011. That is, the dubbing processing copies data while the move processing moves data.

It should be understood that the present invention is not limited to the embodiments described above but includes various modifications. For example, the embodiments given above are described in detail to make the present invention easy to understand, and the present invention is not limited to an information processor comprising the complete configuration described above. It is also possible that the configuration of one of the embodiments is added to some other embodiment.

The invention claimed is:

1. An information processing apparatus comprising:
a first recording/reproduction unit, configured to reproduce or record video/audio information from or to a first recording medium;
a second recording/reproduction unit, configured to reproduce or record video/audio information from or to a second recording medium;
a dubbing unit, configured to perform a dubbing operation, in which video/audio information is reproduced from the first recording medium, by using the first recording/reproduction unit, and the video/audio information is recorded to the second recording medium, by using the second recording/reproduction unit;
an output unit, configured to output video/audio information, reproduced by using the first recording/reproduction unit, to a display unit while the dubbing operation is performed by the dubbing unit;
an object condition input unit, configured to receive an instruction specifying a plurality of parameter values, including a name of a particular person and a voice of a particular person, set by a user of an object included in video/audio information recorded on the first recording medium, wherein when the name and voice of the particular person are set by a user, an image representing the particular person and an image representing the voice of the particular person are associated with each other and displayed on the display unit;
a control unit, including a Central Processing Unit (CPU), and configured to control the dubbing unit to reproduce video/audio information from the first recording medium, by using the first recording/reproduction unit, based on a plurality of parameter values set by a user and received by the object condition input unit, and to record the video/audio information to the second recording medium, by using the second recording/reproduction unit; and
a storage unit, configured to store a reproduction history of video/audio information reproduced from the first recording medium, by using the first recording/reproduction unit, based on a plurality of parameter values, including a name of a particular person and a voice of a particular person, set by a user and received by the object condition input unit, while the dubbing operation is performed by the dubbing unit;
wherein an extraction/reproduction operation of a video data is performed by selecting object conditions during a reproduction, and a dubbing operation is performed, based on a reproduction history, which is a history of setting the object conditions regarding video data which have been previously reproduced by the extraction/reproduction operation;
wherein while the dubbing operation is performed by the dubbing unit, the control unit is configured to cause the output unit to output occurrence information regarding a non-reproduction object to the display unit, wherein the non-reproduction object is not included in video/audio information output by the output unit but is included in video/audio information recorded on the recording medium;
wherein while the dubbing operation is performed by the dubbing unit, the object condition input unit is configured to receive an instruction specifying a plurality of parameter values, including a name of a particular person and a voice of a particular person set by a user including the non-reproduction object; and
wherein the control unit is configured to control the dubbing unit to reproduce the video/audio information from the first recording medium, by using the first recording/reproduction unit, and to record the video/audio information to the second recording medium, by using the second recording/reproduction unit, based on the reproduction history stored in the storage unit.

2. The information processing apparatus according to claim 1,
wherein if an instruction specifying a parameter value of an object is received by the object condition input unit while the dubbing operation is performed by the dubbing unit, the control unit is configured to cause the output unit to output a total time of video/audio information satisfying the parameter value to the display unit.

3. The information processing apparatus according to claim 1,
wherein the first recording medium comprises a Hard Disk Drive (HDD);
wherein the second recording medium is selected from the group consisting of an optical disc and a Secure Digital (SD) card;
wherein the storage unit comprises a semiconductor memory; and
wherein the display unit includes a screen.

4. The information processing apparatus according to claim 1,
wherein the plurality of parameter values are input by a user, by any combination of: via a physical interface, determined from a voice of the user, or determined from a facial expression of the user.

5. The information processing apparatus according to claim 1,
wherein at least one of the plurality of parameter values is determined from the voice of a user.

6. The information processing apparatus according to claim 1,
wherein a scene to be removed is determined based upon at least two of the plurality of parameter values.

7. An information processing apparatus comprising:
a recording unit, configured to record information on a recording medium;
a reproduction unit, configured to reproduce information from a recording medium;
an output unit, configured to output information, reproduced by the reproduction to a display unit;

an object condition input unit, configured to receive an instruction, set by a user, specifying a plurality of parameter values, including a name of a particular person and a voice of a particular person, of an object included in information recorded on a recording medium, wherein when the name and voice of the particular person are set by a user, an image representing the particular person and an image representing the voice of the particular person are associated with each other and displayed on the display unit; and a control unit, including a Central Processing Unit (CPU), and configured to control the reproduction unit to reproduce information, from information recorded on the recording medium, based on a plurality of parameter values set by a user and received from the object condition input unit; and a storage unit, configured to store a reproduction history of information reproduced by the reproduction unit, based on a plurality of parameter values, including a name of a particular person and a voice of a particular person, set by a user and received by the object condition input unit;

wherein an extraction/reproduction operation of a video data is performed by selecting object conditions during a reproduction, and a dubbing operation is performed, based on a reproduction history which is a history of setting the object conditions regarding video data which have been previously reproduced by the extraction/reproduction operation;

wherein while information is reproduced from the recording medium by the reproduction unit, the control unit is configured to cause the output unit to output occurrence information regarding a non-reproduction object to the display unit, wherein the non-reproduction object is not included in information output by the output unit but is included in information recorded on the recording medium;

wherein while information is reproduced from the recording medium by the reproduction unit, the object condition input unit is configured to receive an instruction specifying a plurality of parameter values, including a name of a particular person and a voice of a particular person, set by a user including the non-reproduction object; and wherein the control unit is configured to control the reproduction unit to reproduce information, based on the reproduction history stored in the storage unit held by the holding unit.

8. The information processing apparatus according to claim 7,
wherein if an instruction specifying a parameter value of an object is received by the object condition input unit while information is reproduced from the recording medium by the reproduction unit, the control unit is configured to cause the output unit to output a total time of information satisfying the parameter value to said the display unit.

9. The information processing apparatus according to claim 7,
wherein the recording medium comprises a Hard Disk Drive (HDD);
wherein the storage unit comprises a semiconductor memory; and
wherein the display unit includes a screen.

10. The information processing apparatus according to claim 7,
wherein the plurality of parameter values are input by a user, by any combination of: via a physical interface, determined from a voice of the user, or determined from a facial expression of the user.

11. The information processing apparatus according to claim 7,
wherein at least one of the plurality of parameter values is determined from the voice of a user.

12. The information processing apparatus according to claim 7,
wherein a scene to be removed is determined based upon at least two of the plurality of parameter values.

* * * * *